United States Patent

Jensen et al.

[15] 3,688,260

[45] Aug. 29, 1972

[54] SELF-CLOCKING DIGITAL DATA SYSTEMS EMPLOYING DATA-COMPARISON CODES AND ERROR DETECTION

[72] Inventors: Alan K. Jensen, Saratoga; Richard L. Desilets, Mountain View, both of Calif.

[73] Assignee: Transaction Systems, Incorporated, Palo Alto, Calif.

[22] Filed: Sept. 23, 1970

[21] Appl. No.: 74,672

[52] U.S. Cl.................340/146.1 R, 325/41, 329/106

[51] Int. Cl..............................................G08c 25/00

[58] Field of Search........340/146.1, 167 A; 329/106, 329/107; 307/234; 328/111, 114, 135, 146; 325/41, 142; 332/9 R, 9 T

[56] References Cited

UNITED STATES PATENTS

| | | | |
|---|---|---|---|
| 3,396,369 | 8/1968 | Brothman et al. | 340/146.1 |
| 2,917,236 | 12/1959 | Reisch | 235/176 |
| 3,238,501 | 3/1966 | Mak et al. | 340/146.1 X |
| 3,246,247 | 4/1966 | Grindle | 332/9 |
| 3,268,814 | 8/1966 | Du Vivier | 325/41 X |
| 3,390,233 | 6/1968 | Brothman et al. | 340/146.1 X |
| 3,555,298 | 1/1971 | Neelands | 397/235 |
| 3,571,736 | 1/1971 | West | 329/104 |

*Primary Examiner*—Charles E. Atkinson
*Attorney*—Shapiro and Shapiro

[57] ABSTRACT

Coded information, which may be stored in storage media, is decoded and reproduced. The retrieval system may be self-clocking, with decoding being accomplished by comparing pairs of data events or conditions. Messages may be composed of three types of bits, one of which is a special type which permits checking the quality of message reproduction. The special type of bit is designated when the result of an event comparison is within a controlled range of uncertainty. Novel decoding and slope detecting circuits are disclosed.

37 Claims, 16 Drawing Figures

INVENTORS
ALAN K. JENSEN
RICHARD L. DESILETS

BY Shapiro and Shapiro
ATTORNEYS

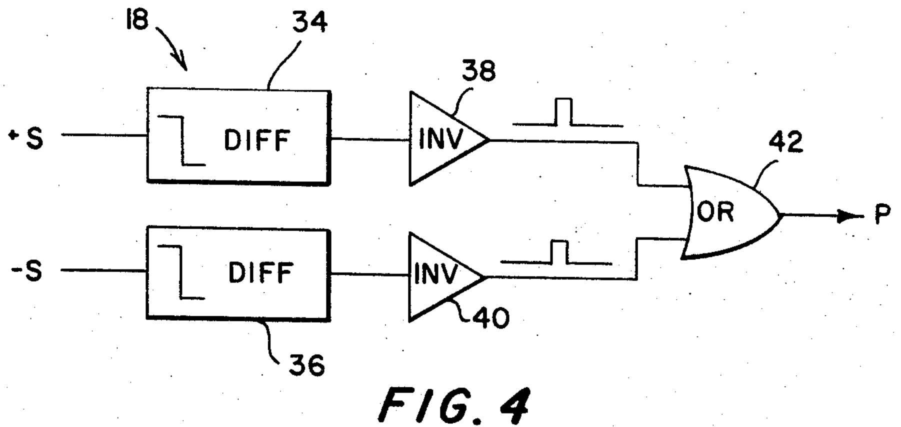
FIG. 4
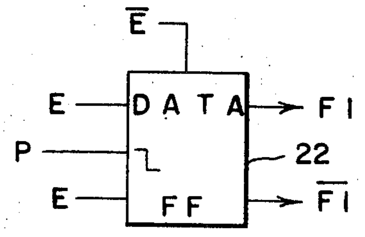
FIG. 5
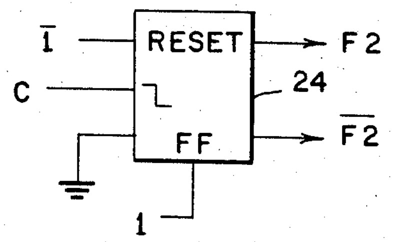
FIG. 6
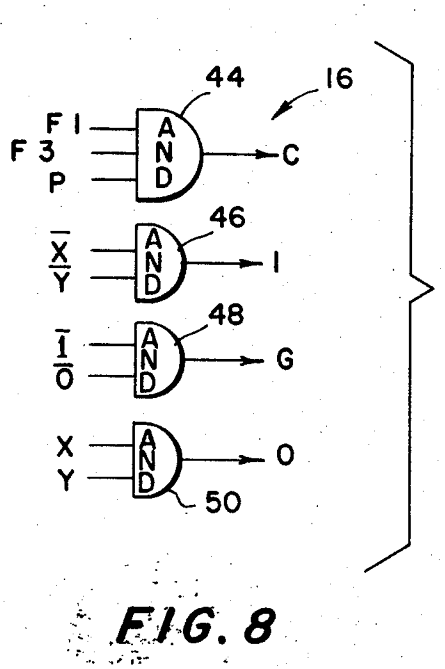
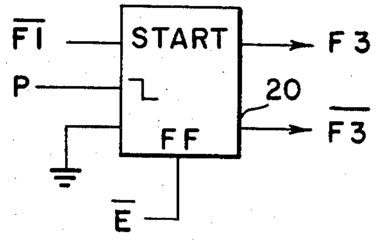
FIG. 7
FIG. 8
INVENTORS
ALAN K. JENSEN
RICHARD L. DESILETS
BY Shapiro and Shapiro
ATTORNEYS

INVENTORS
ALAN K. JENSEN
RICHARD L. DESILETS

BY Shapiro and Shapiro
ATTORNEYS

INVENTORS
ALAN K. JENSEN
RICHARD L. DESILETS

BY *Shapiro and Shapiro*
ATTORNEYS

INVENTORS
ALAN K. JENSEN
RICHARD L. DESILETS

BY *Shapiro and Shapiro*

ATTORNEYS c = a + b c = ab s = 1 sets f = 1 ($\bar{f}$ = 0)

r = 1 resets f = 0 ($\bar{f}$ = 1)

| j | k | $Q_n$ | $Q_{n+1}$ |
|---|---|---|---|
| 0 | 0 | 0 | 0 |
| 0 | 0 | 1 | 1 |
| 1 | 0 | 0 | 1 |
| 1 | 0 | 1 | 1 |
| 0 | 1 | 0 | 0 |
| 0 | 1 | 1 | 0 |
| 1 | 1 | 0 | 1 |
| 1 | 1 | 1 | 0 |

INVENTORS
ALAN K. JENSEN
RICHARD L. DESILETS

BY *Shapiro and Shapiro*
ATTORNEYS

INVENTORS
ALAN K. JENSEN
RICHARD L. DESILETS

Shapiro and Shapiro
ATTORNEYS

SELF-CLOCKING DIGITAL DATA SYSTEMS EMPLOYING DATA-COMPARISON CODES AND ERROR DETECTION

BACKGROUND OF THE INVENTION

This invention is concerned with conveying or retrieving information and is more particularly concerned with extracting coded information from storage media, such as tags associated with articles of merchandise.

Accounting systems for the sale of merchandise ordinarily involve price tags and the like which are associated with individual goods and which must be read and registered at the time of sale. In a rudimentary form such systems employ printed tags which are read by a sales clerk, who enters the appropriate data in a cash register. More refined systems employ tags which are read mechanically, optically, or magnetically and which enter the data into the appropriate register automatically.

It has been proposed heretofore in such systems to employ hand-held tag reading devices having data-sensing elements which are scanned past the recorded data. Some of the problems associated with the use of such readers are due to misalignment or misorientation of the sensing elements relative to the recorded data, variations in scanning speed, reversal of the direction of scan and poor signal-to-noise ratio. Prior proposals for avoiding, correcting, or indicating the existence of these problems have resulted in undesirable complexity of equipment and have imposed undesirable operational restrictions.

BRIEF DESCRIPTION OF THE INVENTION

Accordingly, a principal object of the present invention is to provide improved information conveying and retrieving apparatus and methods, to improve accuracy, reliability, facility, and versatility in conveying or retrieving information, and to reduce the complexity and operational restrictions which have characterized comparable systems of the prior art.

A further object of the invention is to provide improved decoding and slope detection apparatus and methods.

Briefly stated, an illustrative form of the present invention is concerned with an accounting system in which coded information, which may be recorded on tags, for example magnetically, is read, decoded, and reproduced. The recorded information may be contained within a series of data cells, each of which may include a pair of events which are compared to determine their difference as to a specific parameter, but the events to be compared need not be consecutive and need not even be part of the same cell. An output of a special bit type is produced if the result of a comparison falls within a controlled range of uncertainty. Different types of bit outputs are produced if the result of a comparison is outside that range, at one side or the other. Unless the special bit output is produced at one or more predetermined points in a message, and only at such predetermined points, the message may be rejected as being reproduced inaccurately. The nature of the reading system and the recorded data permits the data to be read in either direction and without concern for polarities. The characteristics of the special bit are such that the special bit imposes no artificial restrictions upon the other bits, and the special bit may occupy minimum space in the recorded data. The controlled uncertainty range is proportionally maintained throughout wide variations in the reading speed. A slope detection circuit employed in the invention also accommodates large variations of reading speed, rejects noise below a predetermined threshold, and accommodates large variations of signal amplitude.

BRIEF DESCRIPTION OF THE DRAWINGS

The invention will be further described with reference to the accompanying drawings, which illustrate preferred and exemplary embodiments, and wherein:

FIGS. 2 – 8 are block diagrams of portions of the system of FIG. 1;

DETAILED DESCRIPTION OF THE INVENTION

Figure 1:
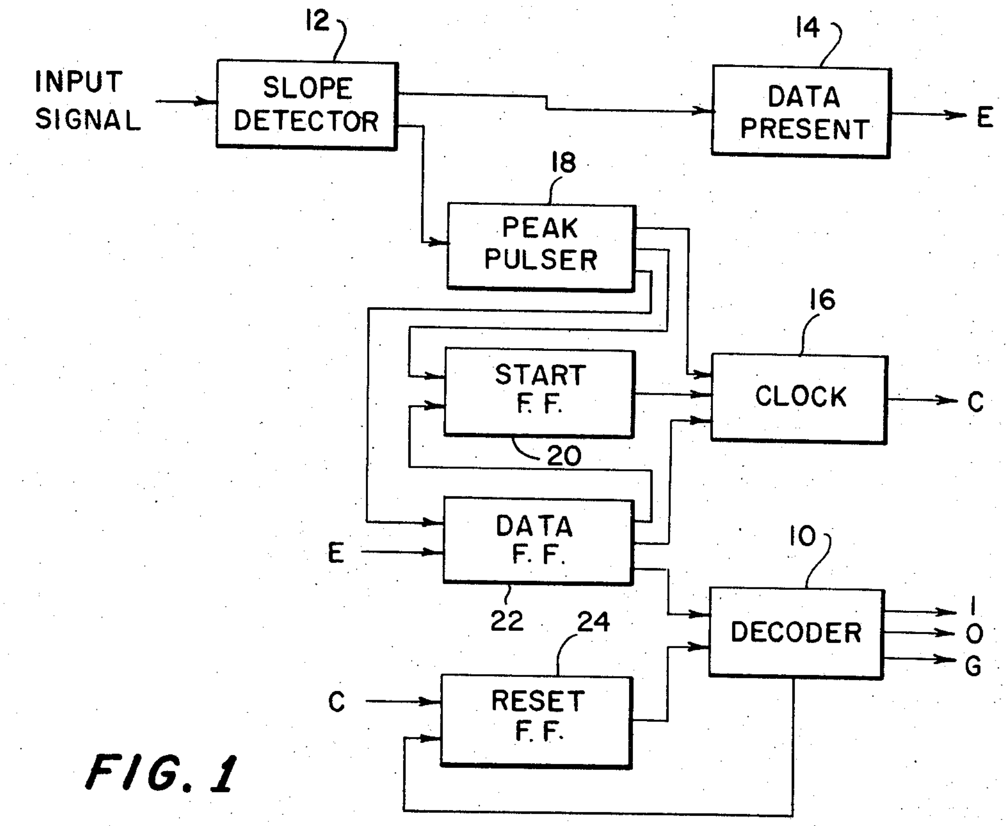
FIG. 1 is a block diagram of a system in accordance with the invention for reading coded information.

The present invention may be employed, for example, in the reading of magnetically recorded tags associated with articles of commerce, as shown for example in U.S. Pat. No. 3,111,576 granted to L.D. Lipschutz on Nov. 19, 1963. As is well known in the art, the recorded information in the form of variations in the flux pattern of the magnetic medium of the tag may be scanned by a conventional magnetic read head held in the hand of a sales clerk. The signal from the coil of the read head will, if the message is properly transduced, represent the coded recorded data.

In an illustrative system employing the invention, the information to be retrieved is recorded in a series of data cells, which need not be of equal length. Each cell may contain a pair of data events or information conditions which are to be compared as to a specified parameter to determine the identification of the data within the cell. For example, the events may be successive pulses of opposite polarity (represented by saturation of the magnetic medium in opposite directions) the lengths or durations of which are to be compared. Such a "proportional" coding system is disclosed, for example, in U.S. Pat. No. 2,887,674granted May 19, 1959 to G. B. Greene. In the Greene patent each cell represents one of only two possible bits. U.S. Pat. No. 3,281,806, granted Oct. 25, 1966 to R.B. Lawrance et al., discloses a somewhat similar proportional coding system in which each cell may represent any one of four possible bit pairs.

In accordance with an important feature of the present invention, the events of each pair contained within a data cell are compared to determine their difference, and if the difference falls within a controlled range or band of uncertainty or indistinguishability, a particular output is produced designating a "special" bit. This bit will be termed a "gray" bit and represented by the letter G, because the result of the comparison lies in a "gray" or uncertain area. If the result of the comparison lies outside of the uncertainty range, an output of a first predetermined type or a second predetermined type will be produced, depending upon whether the comparison result falls at one side of the range or the other. Thus, a "one" may be produced, for example, if a cell contains a short pulse followed by a distinctly longer pulse, and a "zero" may be produced, for example, if a cell contains a long pulse followed by a distinctly shorter pulse. If, however, the duration of one pulse of a cell relative to the duration of the other is not distinctly different, so that the difference falls within the uncertainty range, a "gray" bit will be designated. It is apparent that the events to be compared need not be consecutive. Indeed, the "gray" bit concept of the invention, which avoids the necessity for stating absolutely whether all bits are clearly "ones" or "zeros", for example, may be utilized in other types of decoding systems, as for example systems in which a comparison is made against some external standard.

In accordance with one aspect of the invention, the message recorded on a tag or other recording medium includes a "gray" bit intentionally recorded at one or more predetermined positions within the message. Thus, for example, the recorded message may include a preamble consisting of a predetermined number of information cells in sequence, followed by a "gray" bit, followed by the body of the message, which may include a variable number of data cells (but preferably always a different number from the preamble). The information contained within the preamble may include data as to the number of cells in the body of the message. Thus, if reading of the tag shows the presence of a number of cells known to constitute a preamble, followed by a "gray" bit, followed by a number of cells specified by the information contained in the preamble, and if no other "gray" bits are found in the message, it will be known with a high degree of certainty that the message has been read completely, in the proper direction, and accurately. The presence of a "gray" bit at a non-predetermined point in the message would indicate an inaccuracy in the reading of the message, or merely reversed reading of the message.

Since the "gray" bit intentionally recorded in accordance with the present invention produces the same response as an uncertainty in the reading of any other bit, and produces the same response regardless of reading direction, the provision of the highly useful "gray" bit does not impose artificial restrictions upon the types of bits which may be present at other cells. Moreover, the "gray" bit may comprise two pulses of minimum duration (the minimum duration depending upon the resolution of the system), so that the intentional provision of a "gray" bit need not unduly increase the length of the message.

Turning now to a system of the invention for reading data recorded or transmitted in the foregoing form, the system of FIG. 1 includes a decoder 10 for producing "one," "zero," and G (gray) bit output signals from a data train input signal applied to a slope detector 12. Other output signals of the system of FIG. 1 include output E from a data present circuit 14 and output C from a clock 16. The data present circuit 14 is controlled by the output of the slope detector 12, and the clock 16 is controlled by outputs from a peak pulser 18, a start flip-flop 20, and a data flip-flop 22. The peak pulser 18 is controlled by the output of the slope detector 12 and also provides inputs to the start flip-flop 20 and the data flip-flop 22. The start flip-flop 20 receives an input from the output of the data flip-flop 22, and the data flip-flop 22 also provides an output to the decoder 10. The output signal E is applied to an input of the data flip-flop 22, and the clock signal C is applied to an input of a reset flip-flop 24, which also receives an input from the decoder 10 and which in turn provides an output to the decoder 10. The various interconnections shown in FIG. 1 are not intended to be complete, but are merely to show the general relationships between the parts of the system. Specific interconnections will be designated more fully in the figures of the drawings which will now be described.

Figure 16:
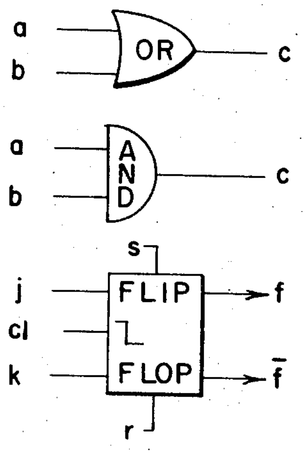
FIG. 16 is an explanatory block diagram.

Before the blocks in FIG. 1 are described in greater detail, however, reference will be made to FIG. 16, which illustrates the logic symbols employed herein. Positive logic sense is assumed. Logical "ones" are assumed to be positive potentials and logical "zeros" ground potential. (These logical symbols should not be confused with the code bits.) Thus, a positive potential ("one") applied to either terminal *a* or *b* of the OR circuit or to both terminals *a* and *b* of the AND circuit, will produce a positive potential at terminal *c* (or any flip-flop output terminal), the potential is assumed to be at ground. In the four-column chart adjacent to the flip-flop symbol, $Q_n$ represents the initial state of the flip-flop and $Q_{n+1}$ the steady state of the flip-flop after the negative transition or excursion of a positive clock pulse at terminal *cl* for different conditions at terminals *j* and *k*.

A basic goal of one form of apparatus of the invention is to determine the information content of a wave of variable frame or cell frequency, over a wide amplitude range, of either polarity, given only a wave which is encoded by having two successive events or pulses within a frame or cell which are distinctly unequal in duration (or which may not be distinctly unequal). Referring to the waveform diagram of FIG. 11, the top line represents a portion of the recorded information. If the information is magnetically recorded, the positive pulses may be thought of as representing positive saturation and the negative pulses as representing negative saturation of the magnetic medium. Three information cells are shown, successively containing a "one" bit, a "zero" bit and a G bit. The second line of the waveform diagram represents the playback waveform for a magnetic read head of fair resolution, the read head being scanned past the recorded data cells sequentially and with predetermined orientation (at least approximately). If the orientation of the read head were reversed, the polarity or phase of the playback waveform would also be reversed.

Figure 2:
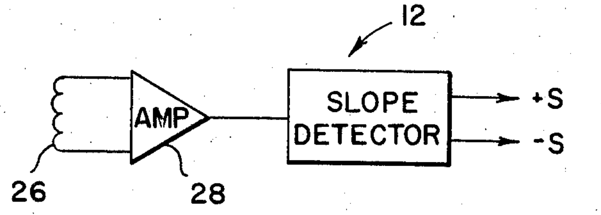
Figure 3:
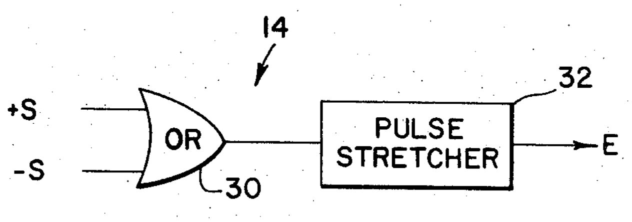
Figure 11:
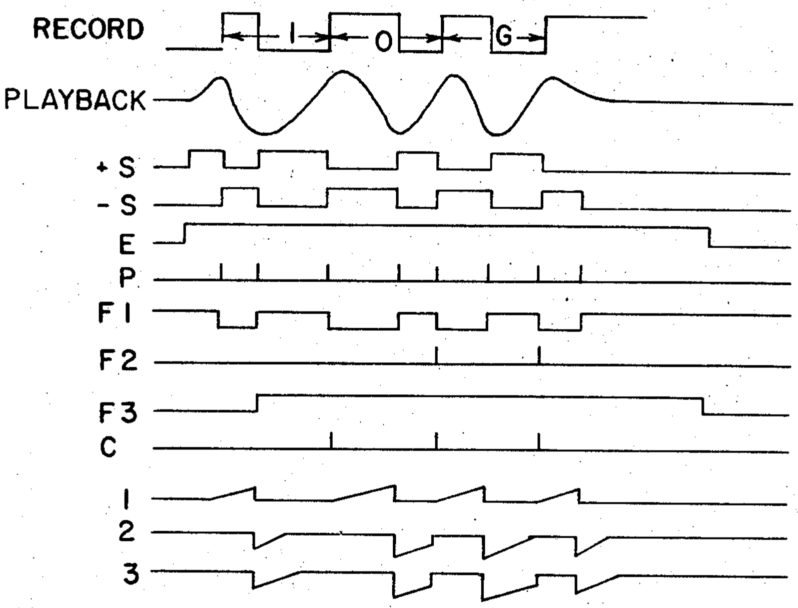
FIG. 11 is a waveform diagram illustrating the operation of the invention.

The read head is illustrated diagrammatically by the coil 26 in FIG. 2 shown connected to the input of an amplifier or pre-amplifier 28. The output of this amplifier is connected to the input of the slope detector 12 (to be described more fully hereinafter), which produces the waves +S and −S (see FIG. 11) at corresponding terminals. The waves +S and −S are connected to the inputs of OR circuit 30 (FIG. 3), the output of which is connected to the input of a positive pulse stretcher 32 (such as a Fairchild retriggerable monostable multivibrator "9601"), which will produce a positive output E and will not revert to its ground state until the waves +S and −S have not been present at the input for a specified time. The wave E thus shows the presence of data, as indicated in FIG. 11.

As shown in FIG. 4, the +S and −S waves are connected to the inputs of negative differentiator circuits 34 and 36, the outputs of which pass through inverters 38 and 40 and are applied to the inputs of OR circuit 42. The output of the OR circuit is a train of control pulses P nearly coincident in time with the peaks of the input waveform (see FIG. 11). This train of pulses will allow the data flip-flop 22 (FIG. 5) to toggle back and forth from a known starting state (i.e., F1 = 1, set by $\overline{E}$). The F1 output of the data flip-flop 22 is shown in FIG. 11.

As shown in FIG. 7, the start flip-flop 20 is reset (to F3 = 0) in the absence of data (when $\overline{E}$ = 1). The first control pulse P applied to the data flip-flop 22 (FIG. 5) produces F1 = 0 and $\overline{F1}$ = 1. Thus with $\overline{F1}$ = 1 applied to the "*j*" terminal of the start flip-flop 20, the second control pulse P sets the start flip-flop to F3 = 1, as indicated in FIG. 11. The second control pulse P also produces the output F1 = 1 from the data flip-flop 22. As shown in FIG. 8, F1 and F3 are applied as inputs of an AND circuit 44, and a clock pulse C is produced when the third control pulse P is applied as an input of the AND circuit 44. This is also shown in the waveform diagram of FIG. 11. The first clock pulse, being produced by the third control pulse P, is located in time at the end of the playback waveform for the first cell.

Figure 9:
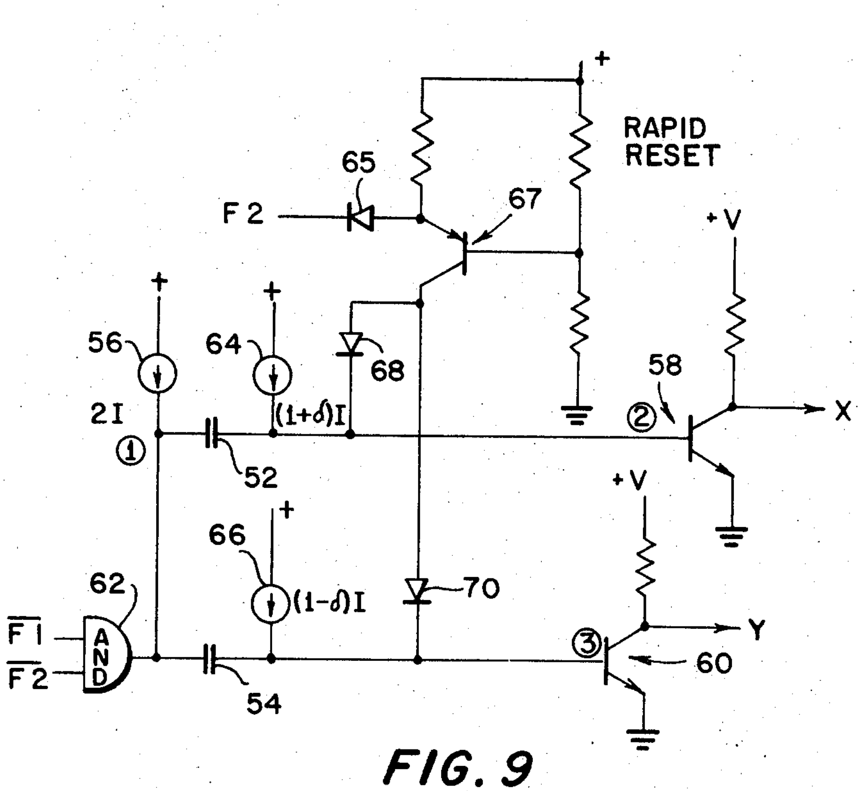
FIG. 9 is a schematic diagram of a decoder circuit in accordance with the invention.

The circuit of FIG. 9 (together with the AND circuits 46, 48 and 50 of FIG. 8) corresponds to the decoder 10 of FIG. 1. This circuit includes a pair of capacitors 52 and 54, which are charged from a constant current source 56 through the base-to-emitter path of corresponding transistors 58 and 60. The charging current has the value 2I. The waveforms at points (1), (2) and (3) of the circuit are shown in the corresponding diagrams of FIG. 11. It will be noted that when F1 = 0 ($\overline{F1}$ = 1) the potential at point (1) rises as the capacitors charge. The charging time is thus the duration of the first pulse of an information cell. At the end of the first information pulse the data flip-flop 22 is set to F1 = 1. The $\overline{F1}$ input of the AND circuit 62 of FIG. 9 thus goes to zero, and the output of the AND circuit becomes zero or ground.

The sudden grounding of point (1) in the circuit of FIG. 9 lowers the potential at points (2) and (3), as shown in FIG. 11, causing transistors 58 and 60 to cut off. Constant current discharge sources 64 and 66 then discharge the capacitors 52 and 54, respectively. Source 64 has a current value of $(1 + \delta)$ I, while source 66 has a current value of $(1 - \delta)$I. $\delta$ may be 0.2, for example. Capacitors 52 and 54 thus discharge at different rates during the second pulse of each data cell.

The conduction states of transistors 58 and 60 at the end of the second data pulse of each cell, represented by the potentials X and Y, determine the identification of the bit of that cell. If the bit is distinctly a "one" (represented by a short-long data pulse pair), both capacitors 52 and 54 will have time to discharge during the second pulse of the cell, and both transistors 58 and 60 will again be conducting at the end of the cell. Thus, potentials X and Y will be low, and the potentials $\overline{X}$ and $\overline{Y}$ at the inputs of AND circuit 46 (FIG. 8) will be high, producing a "one" at the output of the AND circuit. If the bit is distinctly a "zero" (represented by a long short data pulse pair), neither capacitor 52 nor 54 will have time to discharge during the second data pulse of the cell, and neither transistor 58 nor transistor 60 will be conducting at the end of the cell. Potentials X and Y will therefore be high, and a "zero" output will be produced from AND circuit 50 (FIG. 8).

If capacitor 52 has discharged by the end of the second data pulse of a cell and capacitor 54 has not (the discharge rate for capacitor 52 being faster because of the higher current from source 64), transistor 58 will then be conducting, but transistor 60 will not. Thus potential X will be low and potential Y will be high, and since these conditions cannot produce a "one" output from AND circuit 46 or a "zero" output from AND circuit 50, the $\overline{1}$ and the $\overline{0}$ inputs to AND circuit 48 will be positive, producing a G output from this AND circuit.

If, at the end of a cell, the conditions of transistors 58 and 60 are such as to indicate that a "one" is not produced, one or both of capacitors 52 and 54 still retains some charge which must be discharged before the next charging interval. The reset flip-flop 24 (FIG. 6) will now be set (on the negative excursion of the next clock pulse C) to F2 = 1 by the $\overline{1}$ input at the "*j*" terminal. The setting of F2= 1 has two effects. First, since $\overline{F2}$ equals zero, the output of AND circuit 62 is at ground, preventing the charging of capacitors 52 and 54. Second, the positive potential applied to the cathode of diode 65 renders this diode non-conductive, permitting the emitter of reset transistor 67 to become sufficiently positive to turn the transistor on, and to permit the transistor 67 to pass current through the diodes 68 and 70 and rapidly reset or restore either or both of capacitors 52 and 54 to their discharged condition.

The pulses F2 in FIG. 11 are seen to occur when a charge remains on either capacitor at the end of a cell, as indicated by the potential at point (2) or point (3). When the rapid resetting operation is complete, transistors 58 and 60 are rendered conductive again, producing a "one" output from AND circuit 46 and resetting flip-flop 24 to F2=0. The F2 pulses, while quite short because of the rapid resetting, vary in duration in accordance with the amount of resetting required. The resetting operation occurs only when necessary and is extremely rapid, so that substantial time is not added to or unavailable for the desired decoding operation.

In the foregoing description of rapid resetting it has been noted that the resetting operation is complete when the conditions of the transistors 58 and 60 are such as to produce a "one" output from AND circuit 46. This output is not significant in terms of the intelligence conveyed, because, as will be seen hereinafter, the outputs produced by the AND circuits 46, 48 and 50 are of no significance with respect to conveying intelligence until the outputs are actually read or sampled, which occurs only when a clock pulse C is produced at the end of a data cell.

Figure 12:
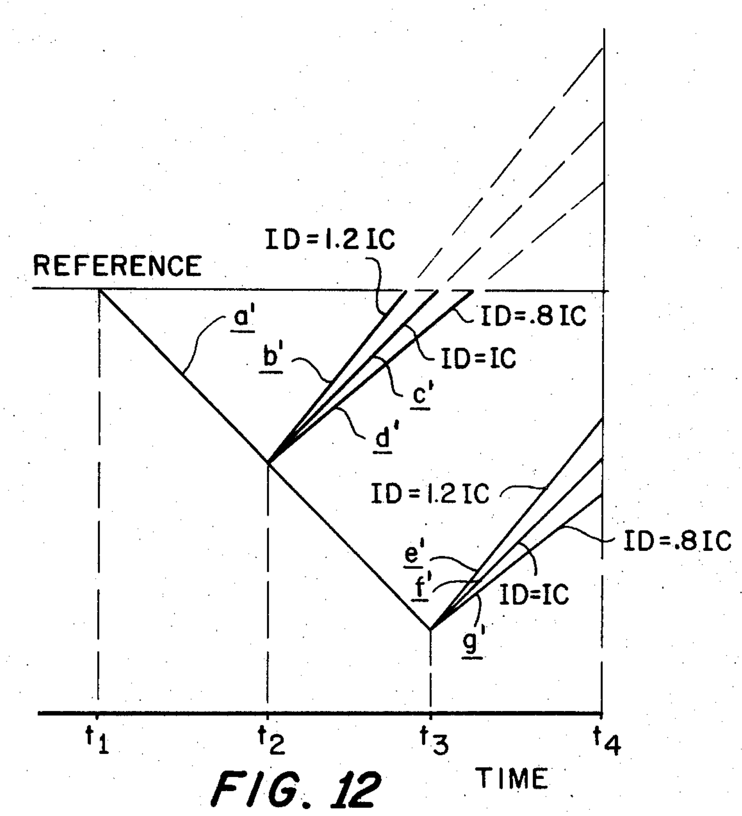
FIG. 12 is a graphical diagram illustrating operation of the decoder circuit of the invention.

The operation of the circuit of FIG. 9 in producing "one," "zero," and "$G$" bit outputs is further explained with reference to FIG. 12. The horizontal "reference" line represents the discharged state of capacitors 52 and 54. Line $a'$ extending downwardly to the right from the reference at time $t_1$ represents the increase in charge upon the capacitors with time (at the same rate for both capacitors during the charging interval. If the first data pulse of a cell is short relative to the second (e.g., half the duration of the second), the capacitors will start to discharge at time $t_2$, while if the first pulse is long relative to the second (e.g., twice the duration of the second), the capacitors will commence discharging at time $t_3$. Line $b'$ represents the discharge of a capacitor at 1.2 times the charging rate, line $c'$ the discharge at a rate equal to the charging rate, and line $d'$ the discharge at a rate equal to 0.8 times the charging rate, for a short-long sequence of data pulses in a cell. Lines $e'$, $f'$, and $g'$ represent the designated discharge rates, respectively, for a long-short data pulse sequence of a cell.

For the short-long sequence, it will be noted that all of lines $b'$, $c'3$ and $d'$ reach the reference level before the sampling time $t_4$ at the end of the data pulse sequence, whereas for the long-short sequence all of lines $e'$, $f'$, and $g'$ fail to reach the reference level by sampling time $t_4$. If time $t_2$ is moved toward time $t_4$, a condition will ultimately be reached at which line $b'$ attains the reference level before sample time $t_4$ and line $d'$ fails to attain the reference level by sample time. Thus, the decoding operations for the corresponding capacitors would fail to agree. Similarly, if time $t_3$ is moved toward time $t_2$, a condition will be reached at which line $e'$ attains the reference level by sample time and line $g'$ does not. These conditions represent conditions of uncertainty as to identification of the bit as a "one" or a "zero," which may be caused, for example, by severe reading speed shifts within a cell, misorientation of read head, poor signal-to-noise ratio, and poor resolution generally. Instead of attempting to designate the bit as a "one" or a "zero" under such conditions of uncertainty, the bit is designated as a special type, G. The range of uncertainty or indistinguishability is determined by the relative discharge rates of the measuring capacitors, and it has been found that this range, expressed as a percentage of difference between the duration of a pair of data pulses, remains substantially constant despite wide variations in the speed at which data are read or received (the standard of comparison for any later event being dependent upon the earlier event). The range may be controlled to meet the needs of the system.

Figure 13:
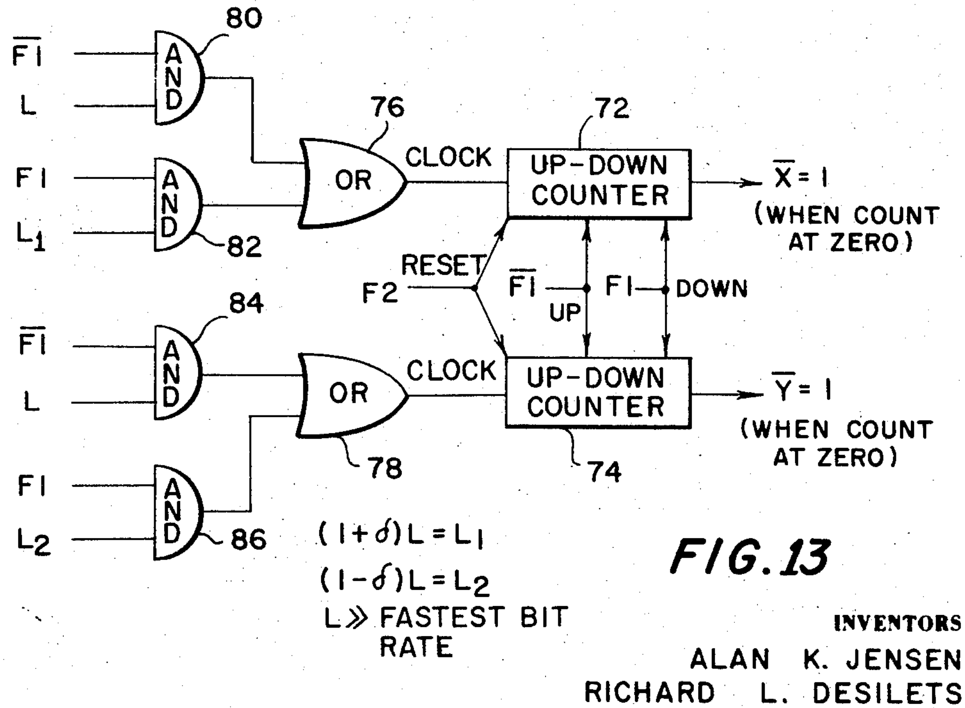
FIG. 13 is a block diagram of another decoder circuit embodiment of the invention.

FIG. 13 illustrates a different embodiment of the decoder circuit (to be utilized with the logic of FIG. 8) for performing essentially the same functions as the decoder circuit of FIG. 9. It will be noted that the circuit of FIG. 13 includes a pair of up-down counters 72, 74 (broadly, accumulators in which a quantity can increase or decrease) which count clock pulses supplied by OR circuit 76 and 78, respectively. OR circuit 76 has inputs from an AND circuit 80 and an AND circuit 82, while OR circuit 78 has inputs from an AND circuit 84 and an AND circuit 86. Both counters count up during the first data pulse of a cell (when $\overline{F1} = 1$) and count down during the second data pulse of a cell (when $F1 = 1$). Neither counter can count below zero. At the end of a cell if a counter reads zero, an output $\overline{X}=1$ or $\overline{Y} = 1$ is produced. Thereafter, if either counter is not at zero, it is reset to zero by $F2 = 1$.

The clock pulses supplied to counters 72 and 74 by AND circuits 80 and 84, respectively, are at the rate L during the initial portion of each data cell, so that both counters count up at the same rate. However, the clock pulses supplied by AND circuits 82 and 86 are at different rates $L_1$ and $L_2$, so that the counters count down at different rates during the final portion of each data cell. The margins of the band or range of uncertainty are thus provided by different clock frequencies.

Instead of employing charge-discharge couples with the same charge rate and different discharge rates in the circuit of FIG. 9, different charging rates (and the same discharge rate) may be used. Similarly, in FIG. 13 different count-up rates (and the same count-down rate) may be employed. The decoding operations with desired ranges of acceptability may be performed by other types of computing apparatus.

Figure 10:
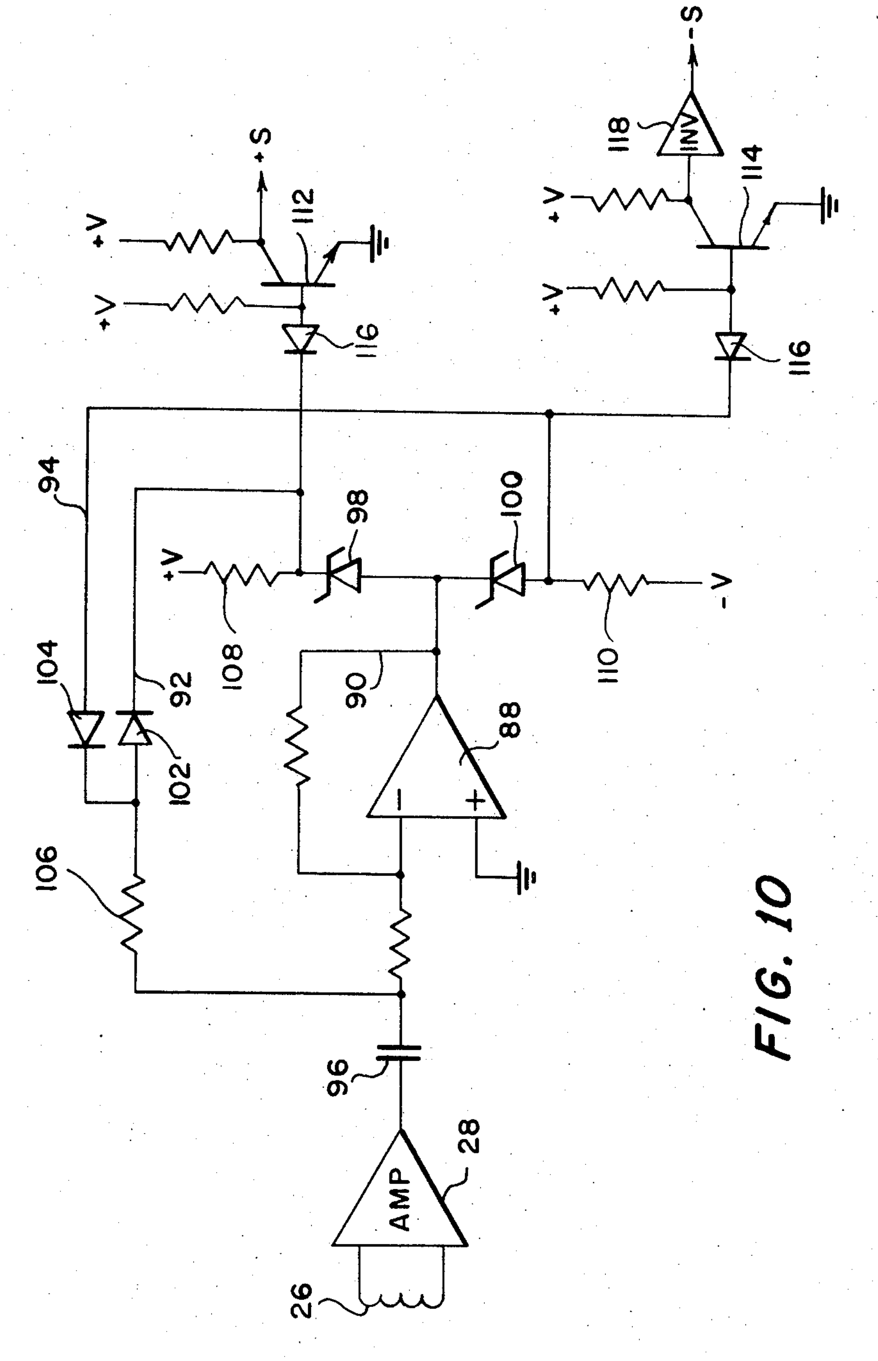
FIG. 10 is a schematic diagram of a slope detection circuit in accordance with the invention.

FIG. 10 illustrates a novel slope detector circuit for producing the waves +S and –S. A goal of the circuit is to provide detection of the slope of a wave (or peak detection) over a broad frequency range and large amplitude range while providing a known threshold for noise rejection. The circuit employs an operational amplifier 88 having, in addition to the usual negative feedback path 90, a pair of negative feedback paths 92 and 94. A capacitor 96 is connected between the output of amplifier 28 and the input of amplifier 88. The circuit has known gain between the input of amplifier 28 and the output of amplifier 88 for signals below a threshold voltage, which are not to be detected as slopes. Positive and negative thresholds are set by Zener diodes 98 and 100 connected in the feedback paths 92 and 94, which include appropriately poled diodes 102 and 104 as well as a resistor 106. The threshold voltages depend upon the reverse biasing of the Zener diodes by bias voltage circuits including the resistors 108 and 110. Transistor 112, having its base connected to Zener diode 98, provides the output wave +S while transistor 114, having its base connected to Zener diode 100, provides the output wave –S. Diodes 116 isolate the base of transistors 112 and 114 from positive-going voltage. An inverter 118 is connected in the output circuit from transistor 114.

In the operation of the circuit of FIG. 10, noise which does not exceed the thresholds set by the Zener diodes 98 and 100 produces no outputs. Thus, a predetermined noise rejection level is provided. For slope signals which exceed the threshold, either positive or negative, corresponding +S or –S outputs are produced, but these outputs are limited in amplitude, because any current substantially in excess of that required to produce an output is absorbed in one of the feedback paths 92, 94, rapid charging or discharging paths for the capacitor 96 being thereby provided. When the signal exceeds a threshold, the circuit becomes, in effect, a differentiator, the resistive impedance across the input terminals of amplifier 88 being quite low compared to the impedance before the threshold is exceeded. The circuit of FIG. 10 has been found to operate well over a broad frequency range and to accommodate a large signal amplitude range, while providing a known threshold for noise rejection.

Figure 14:
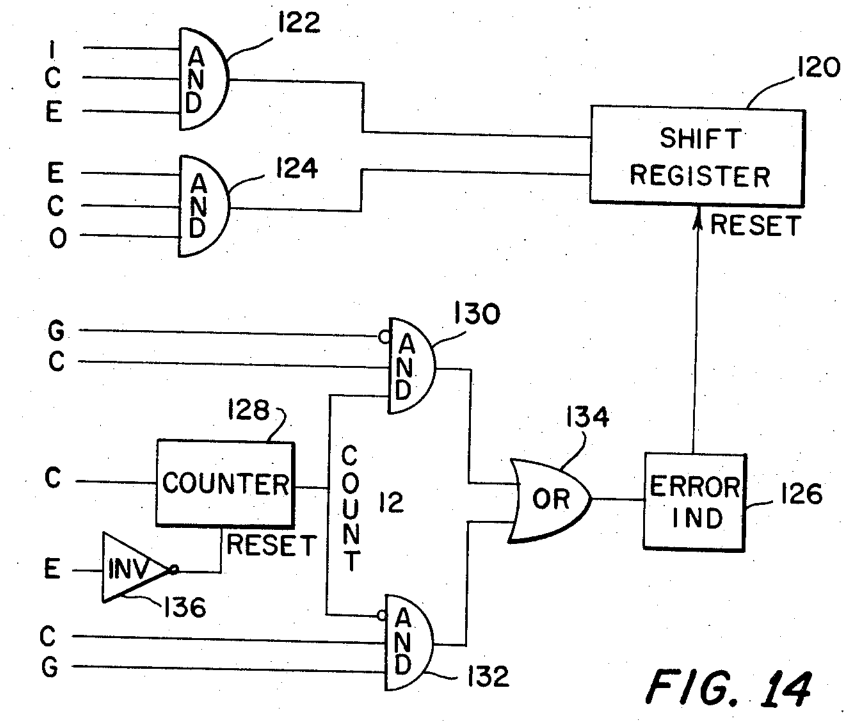
FIG. 14 is a block diagram of a system of the invention for registering the decoded information and for indicating an error in the reading or decoding of the same.

FIG. 14 illustrates diagrammatically a circuit for receiving and registering the output signals produced by the system of FIG. 1. The shift register 120 is to register and indicate (by suitable indicators connected to the stages thereof) the message reproduced by decoding the recorded information. "Ones" and "zeros" are loaded into the shift register 120, at positions corresponding to their positions in the recorded message, by the AND circuits 122 and 124, if the data present output signal E is received and if a clock pulse C is received with each bit. Since a clock pulse is transmitted at the end of a data cell, and just before any rapid resetting of the decoder, the bit applied to AND circuit 122 or 124 when a clock pulse is transmitted will properly represent the information in the cell just decoded.

It is desired to indicate an error on an error indicator 126 unless a G bit is present at one or more predetermined points in the message and only at such points. The error indicator 126 may be controlled by a counter 128. In the example shown, if, on the twelfth clock pulse the bit is not G, or if a bit is G on any clock pulse other than the twelfth, an error is to be indicated. When the counter 128 counts twelve clock pulses, an output is applied to AND circuits 130 and 132. Each AND circuit also receives inputs from the clock line and the G bit line. AND circuit 130 is inhibited by G bits, so that in the absence of a G bit, the AND circuit is prepared to produce an output when pulses are applied to its remaining inputs. Thus, if the G bit appears on the twelfth clock pulse, AND circuit 130 will produce no output, and no error indication will be produced by an output from OR circuit 134, which receives inputs from the AND circuits 130 and 132. If a G bit is not present upon the receipt of the twelfth clock pulse, AND circuit 130 will produce an output and an error will be indicated.

The output of counter 128, upon counting twelve clock pulses, inhibits AND circuit 132, so that in the absence of an output from counter 128 the AND circuit is prepared to produce an output when pulses are applied to its remaining inputs. Thus, the presence of a G bit at any time other than the twelfth clock pulse will produce an output from AND circuit 132 and an error will be indicated. As shown, shift register 120 may be reset when an error is indicated. Counter 128 is reset in the absence of a data present signal E applied to inverter 136, so that the counter 128 always starts counting from zero when new data are received.

In a more sophisticated circuit reversed reading of the message may be recognized automatically by the position of the G bit and the message may be properly registered. If the message is read backwards, the G bit will be properly identified because the playback waveform is the same. The decoding operation is independent of the polarity or polarity sequence of the input signal, since the control pulses P, which define the decoding intervals, are independent of polarity or polarity sequence, but "ones" and "zeros" will appear interchanged.

Figure 15:
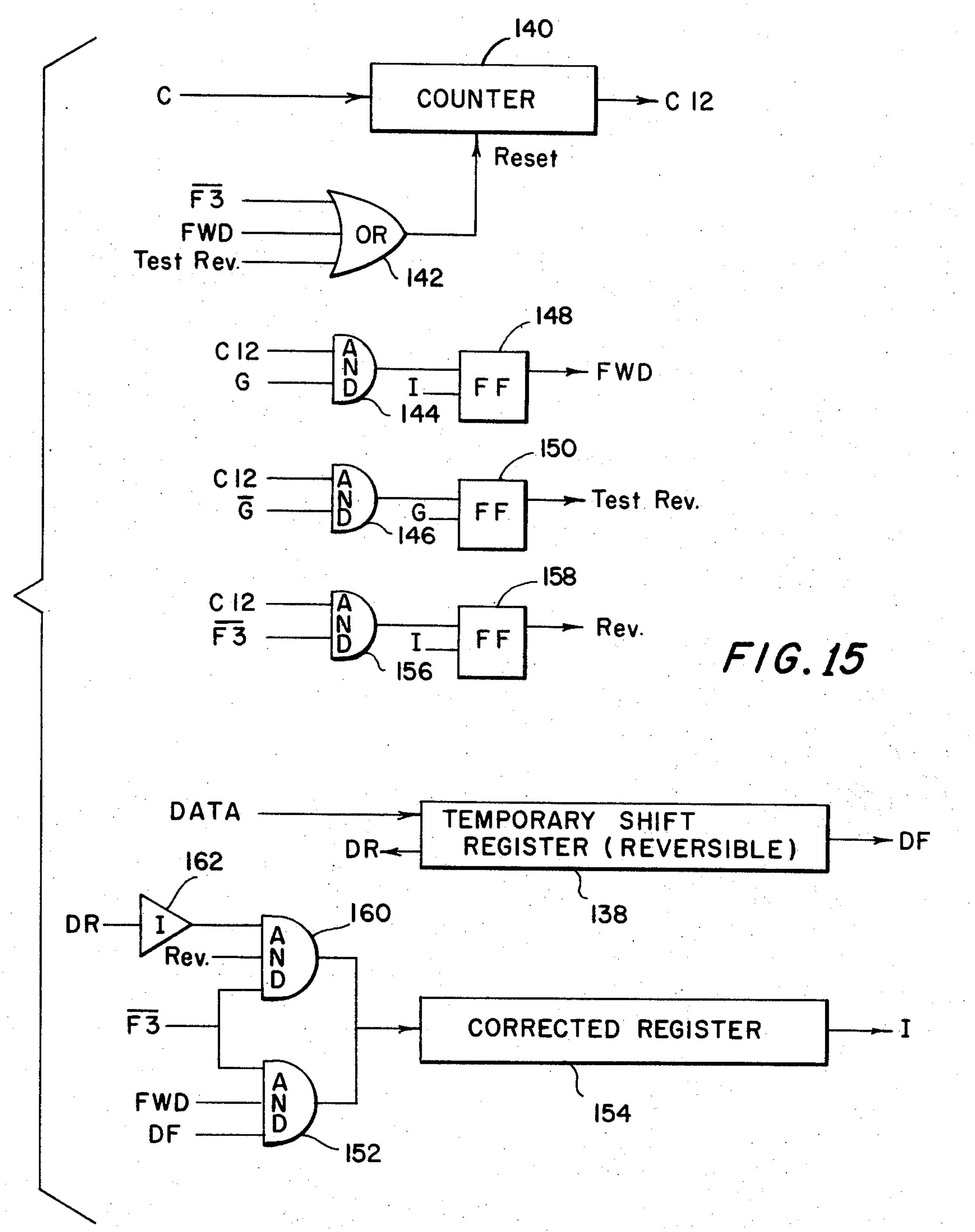
FIG. 15 is a block diagram of a system of the invention for detecting and correcting reversed messages.

FIG. 15 illustrates a typical reverse message recognition and correction system. While the decoded data ('-'ones" and "zeros") are fed into a temporary shift register 138 (as from the AND circuits 122 and 124 of FIG. 14) the clocks C are counted by a counter 140. The counter starts counting from zero, because it is reset in the absence of a message (by signal $\overline{F3}$ applied to OR circuit 142). On a preselected count, for example count 12, the counter produces an output C12, and AND gates 144 and 146 "sample" to determine if the gray bit G is present, setting one or the other of flip-flops 148 and 150. If flip-flop 148 is set, it produces an output FWD (indicating that the message has been read in the forward direction) and resets counter 140. When $\overline{F3}$ reappears (end of message), AND gate 152 will connect the output DF of the temporary shift register 138 to the input of a corrected register 154, and the message will merely be transferred into the corrected register. An output I from the last stage of the corrected register will reset the forward memory flip-flop 148.

If, on the other hand, the gray bit is not present at the twelfth count of counter 140, the test reverse flip-flop 150 will be set, producing an output "Test Rev," which is applied to OR circuit 142 to reset the counter 140. The counter remains reset until the gray bit G does appear. The gray bit resets flip-flop 150 and allows the counter to proceed. If the message is merely reversed, then an output C12 will be produced when $\overline{F3}$ appears (since the gray bit is twelve positions from the beginning of the message). An output from AND circuit 156 will set the reverse message flip-flop 158, producing an output "Rev" for application to AND gate 160. At the end of the message, when $\overline{F3}$ is present, shift register 138 (which is reversible) will be shifted in reverse to produce an output DR, which, after inversion by an inverter 162, is applied to AND circuit 160 for supplying the corrected register 154 with the message. The inverter 162 interchanges the high and low levels in the output train DR from the temporary shift register in order to interchange "ones" and "zeros," which, as indicated above, are interpreted oppositely if the message is read in reverse. As in the case of a forward message, when the corrected register is loaded, the signal I will reset the reverse flip-flop 158.

The usual clock inputs to registers 138 and 154 and shifting logic, which are conventional, have not been shown in FIG. 15. Moreover, if it is merely desired to indicate that a message has been read in reverse, it is only necessary to connect an indicator to the "Rev" output of flip-flop 158, and the shift register portions of the system may be eliminated. The "response" to a reversed message will be manifested when the gray bit appears at a position which is the complement of its normal position in the message.

While preferred embodiments of the invention have been shown and described, it will be apparent to those skilled in the art that changes can be made in these embodiments without departing from the principles and spirit of the invention, the scope of which is defined in the appended claims. The invention is not restricted to data stored magnetically or to the use of particular codes. Moreover, the data may be monitored and merely stored for later reconstruction.

The invention claimed is:

1. A method of machine monitoring data events, comprising producing a first type of machine output in response to an event which, as to a certain distinguishing parameter, is distinctly of a first kind, producing a second type of machine output in response to an event which, as to said parameter, is distinctly of a second kind, and producing a third type of machine output in response to events which, as to said parameter, are within a certain range of indistinguishability from said first kind and said second kind, the production of said outputs including machine operations in which the distinguishing parameter of any data event is compared with a parameter obtained from another data event.

2. A method of machine monitoring data events, comprising producing a first type of machine output in response to an event which, as to a certain distinguishing parameter, is distinctly of a first kind, producing a second type of machine output in response to an event which, as to said parameter, is distinctly of a second kind, producing a third type of machine output in response to events which, as to said parameter, are within a certain range of indistinguishability from said first kind and said second kind, the production of said outputs including machine operations in which the distinguishing parameter of any data event is compared with a parameter obtained from another data event, and responding in a certain manner to said third type of output at any position in said train, except at least one predetermined position, for indicating that the train has been monitored incorrectly.

3. A method of machine monitoring data events, comprising producing a first type of machine output in response to an event which, as to a certain distinguishing parameter, is distinctly of a first kind, producing a second type of machine output in response to an event which, as to said parameter, is distinctly of a second kind, producing a third type of machine output in response to events which, as to said parameter, are within a certain range of indistinguishability from said first kind and said second kind, said first kind of event being defined by a sequence of code elements which is the reverse of the sequence of code elements defining the second kind, the production of said first and second output types depending upon said sequences of code elements, respectively, and said third type of output being produced independently of sequence of code elements.

4. A method of monitoring data in the form of pairs of data events which are to be compared as to a specified parameter by a machine, which comprises measuring, by a machine operation, the parameter of the first event of each pair, measuring, by a machine operation, the parameter of the second event of each pair, determining, by a machine operation, the difference between the measured parameters, producing a first response from said machine if the difference is within a certain range, and producing a second or third response from said machine if the difference is beyond said range at one side or the other, respectively.

5. Apparatus for reading a message in the form of a series of data events, which are to be compared in pairs to determine the identification of the data, comprising means for comparing the events of each pair as to a predetermined parameter and determining the difference between said events, means for producing a first type of output when the difference between said events is any value within a predetermined range, means for producing a second type of output when the difference between said events is outside the said range at one side thereof, and means for producing a third type of output when the difference between said events is outside said range at the opposite side thereof.

6. Apparatus in accordance with claim 5, wherein the data events comprise pulses and said parameter is pulse length.

7. Apparatus in accordance with claim 5, further comprising means responsive to a series of said outputs for reproducing said message, and means for indicating an error in the reproduction of said message in response to the absence of an output of said first type at a predetermined position in said series.

8. Apparatus in accordance with claim 5, wherein said data events are pulses recorded upon a magnetic medium and in which said comparing means comprises means for detecting the relative durations of the pulses of each pair.

9. Apparatus in accordance with claim 5, wherein said comparing means comprises means for accumulating a quantity at a certain rate during a first event of any pair, means for decreasing said quantity at a certain rate during a second event of any pair, and means for determining whether any of the accumulated quantity remains after the said decrease.

10. Apparatus in accordance with claim 9, further comprising means for rapidly resetting the accumulating means after a second event if any of the accumulated quantity remains.

11. Apparatus in accordance with claim 9, said comparing means further comprising further means for accumulating a quantity at a certain rate during a first event of any pair and further means for decreasing the last-mentioned quantity at a certain rate during a second event of any pair, the relative value of the rates of said further accumulating and decreasing means being different from that of the first-mentioned accumulating and decreasing means, means for determining at the end of a second event of any pair whether any of said quantity remains in both said accumulating means, whether any of said quantity remains in one only of said accumulating means, or whether any of said quantity remains in neither of said accumulating means, and means for actuating said output-producing means in response to a corresponding determination by said determining means.

12. A self-clocking digital code reading system in which the code includes a series of data events the comparison of which in pairs determines the indentification of bits, comprising means for producing a series of control pulses, one for each event, means for producing clock pulses in response to alternate control pulses, respectively, and means responsive to each clock pulse for comparing the preceding pair of events.

13. Apparatus for reading a recorded coded message in the form of a series of data events, comprising means for scanning the recorded message and producing a varying signal the phase of which depends upon the relative orientation of said scanning means and the recording medium, means responsive to said signal for producing a series of control pulses in synchronism with the variations of said signal and independent of the phase thereof, and means responsive to said control pulses for decoding the data events of said message.

14. Apparatus in accordance with claim 13, wherein said control pulse producing means comprises means responsive to said signal for producing two oppositely-phased waves having transitions in synchronism with peaks of said signal, means for differentiating said waves, and means for generating control pulses in response to corresponding outputs of predetermined polarity from either of said differentiating means.

15. Apparatus in accordance with claim 13, wherein said medium is magnetic and said signal producing means comprises a magnetic read head.

16. Apparatus in accordance with claim 13, wherein said data events comprise data pulses in associated pairs, one pulse of any pair being distinctly different from the other in one sense, distinctly different from the other in another sense, or within a predetermined range of indistinguishability from the other, and means responsive to the absence of a pair of the last-mentioned type at predetermined positions in said message for indicating that the message has been read incorrectly.

17. A method of detecting slopes or peaks of a signal, which comprises applying said signal to a capacitor in series with a resistive impedance, substantially reducing the effective value of said impedance when the signal applied to said capacitor reaches a predetermined amplitude level, and producing an amplitude-limited output dependent upon the potential across said impedance after said level has been reached.

18. A method in accordance with claim 17, wherein said impedance is constituted by the input impedance of an amplifier and wherein the reduction of the value of the impedance is accomplished by establishing at least one negative feedback path between the output and the input of said amplifier after said level has been reached.

19. A method in accordance with claim 18, wherein two oppositely poled uni-directional negative feedback paths are established.

20. Apparatus for detecting the slope of a wave over a broad frequency range and a large amplitude range while providing a known threshold for noise rejection, comprising an energy storage device, means for storing energy in said device in accordance with the excursions of said wave from a base line, and amplifier means having an input connected to said energy storage device, said amplifier means having a negative feedback circuit connected from its output to said input for absorbing energy from said device substantially beyond a predetermined level, said feedback circuit including a threshold device for rendering the feedback circuit operative only after the energy in said energy storage device exceeds said level, and said apparatus having means for producing an output signal only when said level is exceeded.

21. Apparatus in accordance with claim 20, said feedback circuit comprising a pair of unidirectional current paths of opposite polarity, said paths each including a corresponding threshold device, there being a separate output signal producing means associated with each of said paths, said output signal producing means producing oppositely phased output waves limited to predetermined amplitude in response to the excursions of said wave beyond the corresponding threshold levels.

22. Apparatus for comparing a pair of events as to a predetermined parameter thereof and for determining whether, as to said parameter, the events are distinctly different in a first sense, distinctly different in a second sense or are within a predetermined range of indistinguishability, comprising first means for comparing the said events as to said parameter and producing a signal having a first value depending upon the comparison, second means for producing an output of a first type when both of said signals have a value above a predetermined reference, means for producing an output of a second type when both of said signals have a value below said reference, and means for producing an output of a third type when one of said signals is above said reference and the other of said signals is below said reference.

23. Apparatus in accordance with claim 22, wherein the first comparing means comprises a first quantity-storage increasing and decreasing couple with a first relative rate of storage increase and decrease and wherein the second comparing means comprises a second quantity-storage increasing and decreasing couple with a second relative rate of storage increase and decrease.

24. Apparatus in accordance with claim 23, wherein both couples have the same storage increasing and different decreasing rates or have the same decreasing rate and different increasing rates.

25. Apparatus in accordance with claim 23, wherein each couple comprises a capacitor charging and discharging circuit.

26. Apparatus in accordance with claim 23, wherein each couple comprises an up-down counter.

27. Apparatus in accordance with claim 23, further comprising means for feeding a train of said events to said comparing means, and means operative only after each comparison is complete for rapidly decreasing any quantity remaining in a storing means.

28. Apparatus for comparing data events, which comprises means for accumulating a quantity at a certain rate during a first event, means for decreasing the accumulated quantity at a certain rate during a second event, means for determining at the end of said second event whether any quantity remains in said accumulating means and for producing a corresponding output, means for rapidly restoring said accumulating means to its condition before said first event, and means for actuating said restoring means only when any quantity remains in said accumulating means at the end of said second event.

29. Apparatus in accordance with claim 28, said means for actuating said restoring means comprising means for actuating said restoring means only so long as required to restore said accumulating means.

30. Apparatus in accordance with claim 29, further comprising means for inhibiting the operation of said accumulating means during the actuation of said restoring means.

31. A method of conveying digital information, which comprises forming a data train including pairs of associated data conditions, with the conditions of each pair related in accordance with one of the following criteria:

a. the two conditions differ by at least a minimum in one sense;
b. the two conditions differ by at least a minimum in the opposite sense;
c. the two conditions are the same or differ in either sense by less than said minimums, said data train including at least a special pair of information conditions in accordance with criterion c at predetermined positions in the data train, detecting said data conditions and producing predetermined bit signals in accordance with the criteria of the associated conditions to reproduce the information conveyed, and producing a certain response unless said special pair is detected at said predetermined positions, whereby the special pair permits a check as to the accuracy of the information conveyed.

32. A method in accordance with claim 31, further comprising producing such a response if a special pair is detected at any positions in the train other than said predetermined positions.

33. A method in accordance with claim 31, wherein said conditions comprise the length of data pulses.

34. A method in accordance with claim 31, wherein a response of a predetermined type is produced if the data conditions of said train have merely been detected in reverse order.

35. A method in accordance with claim 31, wherein the detecting of a special pair produces the same signal regardless of the order in which the conditions of the pair are detected.

36. A method in accordance with claim 31, wherein the bit signal produced in accordance with criterion a when the data train is read in one direction is the same as the bit signal produced in accordance with criterion b when the data train is read in the opposite direction, and vice versa, and further comprising interchanging the produced bit signals when the data train has been read reversely.

37. A method of conveying digital information, which comprises forming a data train including pairs of associated data conditions, with the conditions of each pair related in accordance with one of the following criteria:

a. the two conditions differ by at least a minimum in one sense;
b. the two conditions differ by at least a minimum in the opposite sense;
c. the two conditions are the same or differ in either sense by less than said minimums, said data train including at least a special pair of information conditions in accordance with criterion c at predetermined positions in the data train, reading said data train serially and producing predetermined bit signals in accordance with the criteria of the associated conditions to reproduce the information conveyed, and producing a response manifesting that the data train has been read reversely when said special pair is not detected at said predetermined positions but instead is detected at the complement of such positions.

* * * * *